United States Patent
Seo et al.

(10) Patent No.: US 10,739,783 B2
(45) Date of Patent: Aug. 11, 2020

(54) IMAGE PROCESSING METHOD FOR AUTONOMOUS DRIVING AND APPARATUS THEREOF

(71) Applicant: SAMSUNG ELECTRONICS CO., LTD., Suwon-si (KR)

(72) Inventors: Young Wan Seo, Seoul (KR); Paul Barom Jeon, Seoul (KR); Baek Hwan Cho, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 294 days.

(21) Appl. No.: 15/818,347

(22) Filed: Nov. 20, 2017

(65) Prior Publication Data

US 2018/0246521 A1   Aug. 30, 2018

(30) Foreign Application Priority Data

Feb. 24, 2017 (KR) .................. 10-2017-0024824

(51) Int. Cl.
   *G05D 1/02* (2020.01)
   *H04N 5/235* (2006.01)
   (Continued)

(52) U.S. Cl.
   CPC ......... *G05D 1/0246* (2013.01); *G01C 21/165* (2013.01); *G01C 21/26* (2013.01);
   (Continued)

(58) Field of Classification Search
   CPC ............... G05D 1/0246; G05D 1/0088; G05D 2201/0213; G06T 5/009; G06T 7/74;
   G06T 5/50; G06T 2207/10016; G06T 2207/10144; G06T 2207/20221; G06T 2207/30252; H04N 5/2352; H04N 5/235; H04N 5/2356; H04N 5/2354; H04N 5/2355; H04N 5/2351; H04N 5/2353;
   (Continued)

(56) References Cited

U.S. PATENT DOCUMENTS 6,874,420 B2 * 4/2005 Lewis, Jr. ........... B41F 33/0081
                                                    101/181
2005/0046708 A1 * 3/2005 Lim ....................... H04N 5/235
                                                    348/231.6
(Continued)

FOREIGN PATENT DOCUMENTS

JP        9-205645 A      8/1997
JP     2008-126905 A      6/2008
KR  10-2007-0081629 A     8/2007

OTHER PUBLICATIONS

Kang, Sing Bing, et al. "High Dynamic Range Video." *ACM Transactions on Graphics* (*TOG*), vol. 22,. No. 3., 2003 (pp. 319-325).

(Continued)

*Primary Examiner* — Russell Frejd
(74) *Attorney, Agent, or Firm* — Sughrue Mion, PLLC (57) ABSTRACT

A processor implemented image processing method includes recognizing a target object in a first frame of an input image; adjusting an exposure of a second frame of the input image based on a brightness of the target object; and generating a synthesized image by synthesizing the first frame and the second frame.

24 Claims, 8 Drawing Sheets

(51) Int. Cl.
*G06T 5/00* (2006.01)
*G06K 9/20* (2006.01)
*G06K 9/00* (2006.01)
*G06K 9/32* (2006.01)
*G01C 21/16* (2006.01)
*G01S 19/47* (2010.01)
*G01C 21/34* (2006.01)
*G01C 21/26* (2006.01)
*H04N 5/232* (2006.01)
*G06T 7/73* (2017.01)
*G05D 1/00* (2006.01)
*G06T 5/50* (2006.01)

(52) U.S. Cl.
CPC .............. *G01C 21/34* (2013.01); *G01S 19/47* (2013.01); *G05D 1/0088* (2013.01); *G06K 9/00791* (2013.01); *G06K 9/00825* (2013.01); *G06K 9/2027* (2013.01); *G06K 9/3233* (2013.01); *G06T 5/009* (2013.01); *G06T 5/50* (2013.01); *G06T 7/74* (2017.01); *H04N 5/235* (2013.01); *H04N 5/2351* (2013.01); *H04N 5/2352* (2013.01); *H04N 5/2353* (2013.01); *H04N 5/2354* (2013.01); *H04N 5/2355* (2013.01); *H04N 5/2356* (2013.01); *H04N 5/23229* (2013.01); *G05D 2201/0213* (2013.01); *G06K 2209/21* (2013.01); *G06T 2207/10016* (2013.01); *G06T 2207/10144* (2013.01); *G06T 2207/20221* (2013.01); *G06T 2207/30252* (2013.01)

(58) Field of Classification Search
CPC .............. H04N 5/23229; G06K 9/2027; G06K 9/00791; G06K 9/3233; G06K 9/00825; G06K 2209/21; G01C 21/165; G01C 21/26; G01C 21/34; G01S 19/47
See application file for complete search history.

(56) References Cited

U.S. PATENT DOCUMENTS

| | | | |
|---|---|---|---|
| 2006/0008267 A1* | 1/2006 | Kim | H04N 5/243 396/213 |
| 2009/0073306 A1* | 3/2009 | Kwon | H04N 5/2352 348/362 |
| 2009/0147122 A1* | 6/2009 | Kato | H04N 5/23245 348/333.01 |
| 2012/0019686 A1* | 1/2012 | Manabe | G06T 5/009 348/222.1 |
| 2013/0027581 A1* | 1/2013 | Price | H04N 5/2353 348/229.1 |
| 2016/0005313 A1* | 1/2016 | Cholayil | G08G 1/095 340/907 |
| 2016/0105656 A1* | 4/2016 | Lin | H04N 9/735 348/223.1 |
| 2016/0381302 A1* | 12/2016 | Shikata | H04N 5/2356 348/239 |

OTHER PUBLICATIONS

Meylan, Laurence, et al., "High Dynamic Range Image Rendering With a Retinex-Based Adaptive Filter", *IEEE Transactions on Image Processing*, vol. 15, No. 9, Sep. 2006 (pp. 2820-2830).

Marsi, Stefano, et al. "Video Enhancement and Dynamic Range Control of HDR Sequences for Automotive Applications", *EURASIP Journal on Advances in Signal Processing*, May 13, 2007 (9 pages in English).

Extended European Search Report dated Jul. 30, 2018, in corresponding European Application No. 18158136.4 (11 pages in English).

* cited by examiner

IMAGE PROCESSING METHOD FOR AUTONOMOUS DRIVING AND APPARATUS THEREOF

CROSS-REFERENCE TO RELATED APPLICATION(S)

This application claims the benefit under 35 USC § 119(a) of Korean Patent Application No. 10-2017-0024824 filed on Feb. 24, 2017, in the Korean Intellectual Property Office, the entire disclosure of which is incorporated herein by reference for all purposes.

BACKGROUND

1. Field

The following description relates to an autonomous driving image processing method and apparatus.

2. Description of Related Art

Autonomous driving of a vehicle may involve a method of automatically performing various operations to facilitate the driving. For example, an autonomous driving vehicle may drive itself on a road without a user operating a steering wheel, an accelerator pedal, or a brake of the vehicle. A technology for automatically maintaining a distance between vehicles, a technology for indicating a vehicle is departing a lane or staying in a lane, and a technology for informing a vehicle of objects at a rear or side of the vehicle may be used to enable a vehicle to drive autonomously. Various technologies for autonomous driving may be utilized based on neighboring image information acquired from a vehicle.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor implemented image processing method includes a recognize a target object in a first frame of an input image, adjust an exposure of a second frame of the input image based on a brightness of the target object, and generate a synthesized image by synthesizing the first frame and the second frame.

The recognizing of the target object may include recognizing a road in the first frame, setting a region on the road as a recognition region, and recognize the target object in the recognition region.

The recognizing of the target object may include recognizing the target object based on the first frame and a position of a vehicle.

The target object may include any one or any combination of a tunnel entrance, a tunnel exit, and a light of a vehicle.

The adjusting of the exposure of the second frame and the generating of the synthesized image may be performed in response to a difference between the brightness of the target object and a brightness of a remaining region not including the target object in the first frame being greater than a predetermined threshold.

The adjusting of the exposure of the second frame may include decreasing the exposure of the second frame in response to the brightness of the target object being greater than a brightness of a remaining region not including the target object in the first frame, and increasing the exposure of the second frame in response to the brightness of the target object being less than the brightness of the remaining region not including the target object in the first frame.

The generating of the synthesized image may include synthesizing a remaining region not including the target object in the first frame and a region corresponding to the target object in the second frame.

The generating of the synthesized image may include synthesizing a remaining region not including the target object in the first frame and a road region of a region corresponding to the target object in the second frame.

The adjusting of the exposure of the second frame may include decreasing the exposure of the second frame in response to any one or any combination of two or more of a vehicle entering a bright tunnel during nighttime hours, the vehicle exiting a dark tunnel during daytime hours, and the vehicle being backlit.

The adjusting of the exposure of the second frame may include decreasing the exposure of the second frame in response to either one or both of vehicle entering a dark tunnel during daytime hours or the vehicle exiting a bright tunnel during nighttime hours.

A non-transitory computer-readable storage medium may store instructions that, when executed by the processor, cause the processor to perform the method.

In another general aspect, an image processing apparatus includes a processor, configured to recognize a target object in a first frame of an input image, adjust an exposure of a second frame of the input image based on a brightness of the target object, and generate a synthesized image by synthesizing the first frame and the second frame.

The processor may be configured to recognize a road in the first frame, set a region on the road as a recognition region, and recognize the target object in the recognition region.

The processor may be configured to recognize the target object based on the first frame and a position of a vehicle.

The target object may include any one or any combination of two or more of a tunnel entrance, a tunnel exit, and a light of a vehicle.

The processor may be configured to adjust the exposure of the second frame in response to a difference between the brightness of the target object and a brightness of a remaining region not including the target object in the first frame being greater than a predetermined threshold.

The processor may be configured to generate the synthesized image by synthesizing a remaining region not including the target object in the first frame and a region corresponding to the target object in the second frame.

The processor may be configured to generate the synthesized image by synthesizing a remaining region not including the target object in the first frame and a road region of a region corresponding to the target object in the second frame.

In still another general aspect, an autonomous driving vehicle includes an image processing apparatus configured to recognize a target object in a first frame of an input image, adjust an exposure of a second frame of the input image based on a brightness of the target object, and generate a synthesized image by synthesizing the first frame and the second frame, and a control apparatus configured to control the autonomous driving vehicle based on the synthesized image.

The image processing apparatus may be configured to recognize a road in the first frame, set a region on the road as a recognition region, and recognize the target object in the recognition region.

The apparatus may further include a memory coupled to the processor, the memory including an instruction readable by the processor to control the processor to perform the recognizing of the target object, the adjusting of the exposure, and the generating of the synthesized image.

The apparatus may be an autonomous driving vehicle controlling the vehicle dependent upon the synthesized image.

The apparatus may further include an image sensor configured to capture the input image.

According to another general aspect, an autonomous driving vehicle, includes an image sensor configured to capture an image stream comprising frames; a processor coupled to the image sensor and configured to recognize a target object in a first frame of the image stream; either one or both of modify an operational parameter of the image sensor and actuate an auxiliary image sensor based on identified features of the target object in the first frame; capture a second frame comprising the target object using either one or both of the modified operational parameter of the image sensor and the auxiliary image sensor; and, control the autonomous driving vehicle based on the second frame.

Other features and aspects will be apparent from the following detailed description, the drawings, and the claims.

BRIEF DESCRIPTION OF THE DRAWINGS

Throughout the drawings and the detailed description, the same reference numerals refer to the same or like elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Various alterations and modifications may be made to the examples. Here, the examples are not construed as limited to the disclosure and should be understood to include all changes, equivalents, and replacements within the idea and the technical scope of the disclosure.

The terminology used herein is for the purpose of describing particular examples only and is not to be limiting of the examples. As used herein, the singular forms "a", "an", and "the" are intended to include the plural forms as well, unless the context clearly indicates otherwise. It will be further understood that the terms "include/comprise" and/or "have" when used in this specification, specify the presence of stated features, integers, steps, operations, elements, components, and/or combinations thereof, but do not preclude the presence or addition of one or more other features, numbers, steps, operations, elements, components, and/or groups thereof.

Unless otherwise defined, all terms including technical and scientific terms used herein have the same meaning as commonly understood by one of ordinary skill in the art to which examples belong after a thorough understanding of the present disclosure. It will be further understood that terms, such as those defined in commonly-used dictionaries, should be interpreted as having a meaning that is consistent with their meaning in the context of the relevant art and the present disclosure and will not be interpreted in an idealized or overly formal sense unless expressly so defined herein.

When describing the examples with reference to the accompanying drawings, like reference numerals refer to like constituent elements and a repeated description related thereto will be omitted. When it is determined detailed description related to a related known function or configuration they may make the purpose of the examples unnecessarily ambiguous in describing the examples, the detailed description will be omitted here.

Hereinafter, reference will now be made in detail to examples with reference to the accompanying drawings, wherein like reference numerals refer to like elements throughout.

Figure 1:
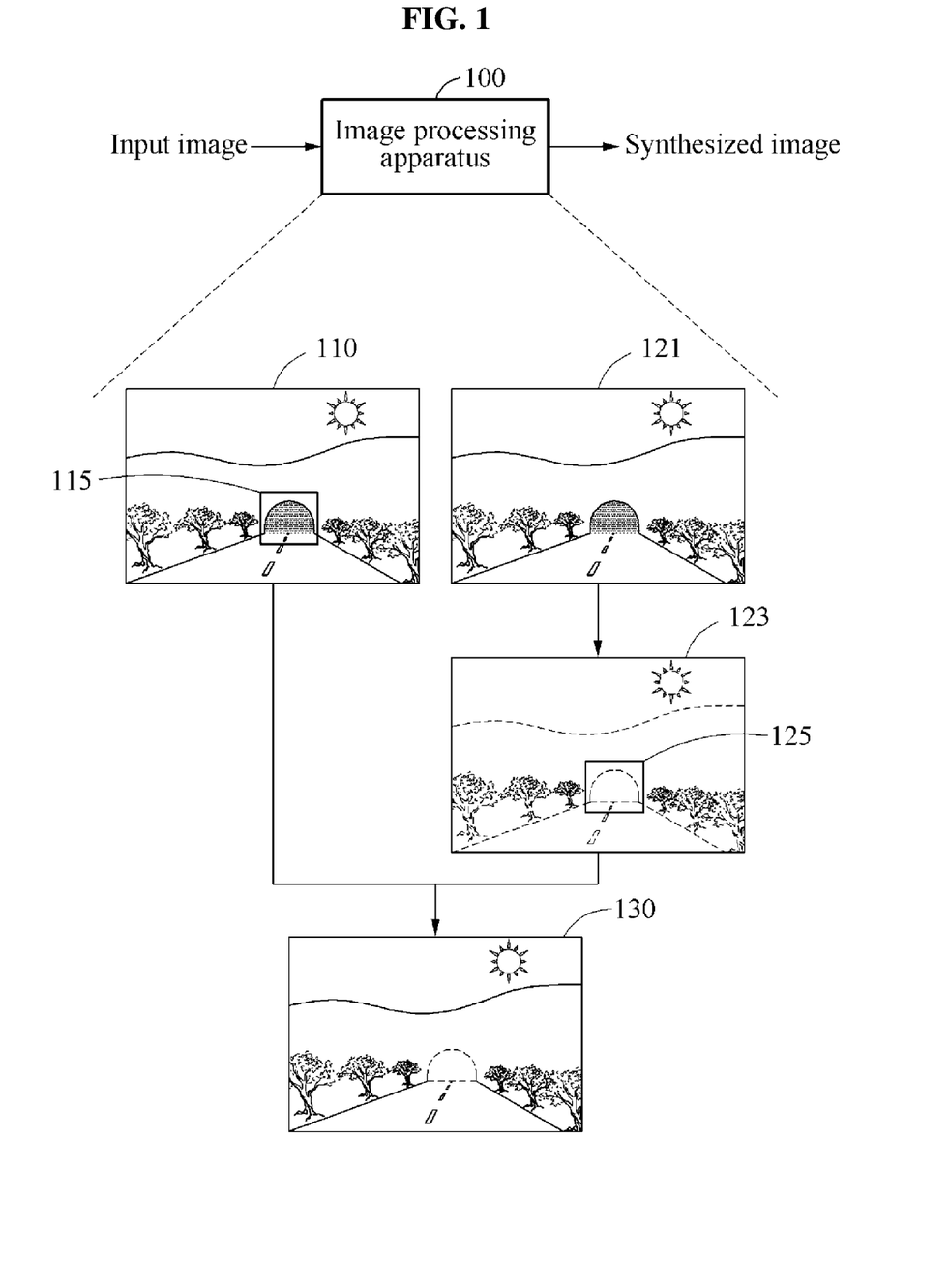
FIG. 1 illustrates an example of an image processing process employing an image processing apparatus.

FIG. 1 illustrates an example of an image processing process. Referring to FIG. 1, an image processing apparatus 100 generates a synthesized image based on an input image. The image processing apparatus 100, according to one or more embodiments, is implemented by at least one hardware module.

The image processing apparatus 100 may be equipped in a vehicle or representative of the vehicle, and the synthesized image may be used for autonomous driving of the vehicle. Autonomous driving generally involves a method of automatically performing various operations to facilitate the driving. For example, in an autonomous driving state, a vehicle drives itself without a driver performing a steering wheel operation, an acceleration operation, and a deceleration operation, or to provide supplemental/information regarding the same to the driver. A technology for automatically maintaining a distance between vehicles, a technology for indicating that the vehicle is departing a lane or staying in a lane, and a technology for informing the vehicle of an obstacle around the vehicle are cooperatively used in examples to enable the vehicle to drive autonomously.

Various technologies for autonomous driving may be utilized based on various pieces of sensing information acquired from a vehicle. For example, herein, a vehicle may acquire image information of surroundings of the vehicle through a camera provided in the vehicle, and understand geographic features of the surroundings of the vehicle based on the image information is performed continuously such as to ensure safe operation. In response to the vehicle being in an environment with a relatively high brightness contrast, it may be difficult to know the geographic features of the surroundings of the vehicle from the image information of the surroundings of the vehicle. For example, in response to the vehicle entering a tunnel, an illumination level around an entrance of the tunnel is relatively high and the illumination level inside the tunnel is relatively low such that the vehicle may be difficult to understand a state of an inside of the tunnel for predictive autonomous driving safely through the tunnel.

The image processing apparatus 100 may recognize a portion having a brightness contrast greater than that of a neighboring portion in the input image and generate the synthesized image by adjusting the brightness of the portion. For example, the image processing apparatus 100 generates a synthesized image based on or somewhat like a high dynamic range (HDR) scheme. In an example, an object estimated to have a brightness contrast greater than that of surroundings may be determined in advance, and the image processing apparatus 100 recognizes a predetermined object in the input image. For example, the predetermined object includes at least one of a tunnel entrance, a tunnel exit, or a light of a vehicle, but the predetermined object is not limited thereto. Hereinafter, the predetermined object is referred to as a target object. The image processing apparatus 100 may recognize a target object and generate the synthesized image by adjusting a brightness of the target object.

The input image may include a plurality of consecutive or substantially consecutive frames. For example, the input image includes a first frame 110 and a second frame 121. The second frame 121, according to one or more embodiments, may be a next frame following the first frame 110. However, any preceding or succeeding frame within a predetermined time window (e.g. suitably adjusted for speed of the vehicle and/or the object) may suitably be employed. In another embodiment, such as where several sensor are employed, a simultaneously acquired frame from another sensor may be employed. Hereinafter, an operation of the image processing apparatus 100 is described based on the first frame 110 and the second frame 121, but the following description may be also applicable to other frames of the input image.

The image processing apparatus 100 recognizes one or more target objects 115 in the first frame 110. To recognize the target object 115 may be understood as to recognize a region corresponding to the target object 115. In an example, the image processing apparatus 100 recognizes the target object 115 based on an image-based object recognition scheme. For example, the image processing apparatus 100 recognizes the target object 115 using a recognizer trained to recognize the target object 115 from the input image. The recognizer, in one or more embodiments, may include an artificial neural network or other machine learning models. The artificial neural network may be trained using training images, such as by back propagation, to recognize the target object 115 from the input image through deep learning. For example, the autonomous driving apparatus 100 may be further considered to be pertinent to the training.

In another example, the image processing apparatus 100 recognizes the target object 115 based on the image-based object recognition scheme and position information of a vehicle. For example, the image processing apparatus 100 detects a position of the vehicle based on any one or any combination of two or more of global positioning system (GPS), GLONASS information, radio triangulation, or other suitable location information. The image processing apparatus 100 may verify whether a predetermined target object is present around the vehicle based on map information. The map information may include types and positions of predetermined target objects. The image processing apparatus 100 may detect the target object 115 in the first frame 110 based on a verification that the predetermined target object is present around the vehicle.

In an example, the image processing apparatus 100 recognizes the target object 115 in a predetermined recognition region. For example, a recognition region is determined as a predetermined region on a road. In this example, the image processing apparatus 100 recognizes the road in the first frame 110 and recognizes the target object 115 on the recognized road. Thus, the image processing apparatus 100 may intelligently avoid consumption of unnecessary power, processing, and/or storage resources used to recognize a region other than the road that does not affect autonomous driving.

The image processing apparatus 100 may adjust an exposure of the second frame 121 in response to the target object 115 being recognized in the first frame 110. A second frame 123 indicates a state in which the exposure is adjusted. The adjusting of the exposure may be performed based on various methods. For example, the image processing apparatus 100 adjusts an exposure time of a camera that captures the input image, adjusts a sensitivity of the camera, or adjusts the exposure of the input image after the input image is captured based on a software method. Other suitable methods of adjusting contrast, such as by employment of auxiliary sensors or auxiliary cameras employing different physical or operational characteristics or parameters, such as aperture, F-stop, zoom, focus, shielding, ultraviolet, or infrared portions of the spectrum may be employed to supplement or modify the primary camera. Infrared, for example, allows for capturing supplemental target information in darkness or other adverse conditions. Thus, the disclosure is not limited to visible-only spectrums and a sole camera operating in that spectrum, but instead contemplates modification of operational parameters and/or use of auxiliary image, lidar, or acoustic sensors to supplement the primary camera.

The image processing apparatus 100 may adjust the exposure of the second frame 121 based on the brightness of the target object 115. For example, in response to the target object 115 being a tunnel entrance, the brightness of the target object 115 may be adjusted because an inside of the target object 115 is difficult to be recognized in the input image during daytime hours. However, the brightness of the target object 115 may be not adjusted because the inside of the target object 115 and an outside of the target object 115 are relatively dark during nighttime hours.

In an example, a real-time image analysis for autonomous driving may be provided for safe driving. When exposures of all frames of the input image are adjusted, a great amount of computing resources may typically be unnecessarily used to adjust the exposures and perform synthesizing, so that the generating of the synthesized image may be disadvantageously delayed, rendering real-time autonomous operation typically impractical. Rather, as only a non-limiting example, the image processing apparatus 100 may adjust the exposure of the second frame 121 with a degree of selectivity, for example, when determined desirable or needed even when the target object 115 is recognized in the first frame 110.

In an example, the image processing apparatus 100 may determine whether the exposure of the second frame 121 is to be adjusted based on a difference between the brightness of the target object 115 in the first frame 110 and a brightness of a remaining region not including the target object 115. The brightness of the remaining region not including the target object 115 may indicate an average brightness of remaining regions not including the target object 115 or a brightness of a neighboring region of the target object 115. For example, the image processing apparatus 100 may adjust the exposure of the second frame 121 in response to the difference between the brightness of the target object 115 and the brightness of the remaining region not including the target object 115 in the first frame 110 being greater than a predetermined threshold. In an example, a threshold is determined in 2 steps. Here, a step indicates an exposure correcting unit used in an exposure system of a camera that captures the input image.

Based on a verification that the exposure of the second frame 121 is to be adjusted, the image processing apparatus 100 may adjust the exposure of the second frame 121 based on the difference between the brightness of the target object 115 and the brightness of the remaining region not including the target object 115 in the first frame 110. For example, in response to the brightness of the target object 115 being greater than the brightness of the remaining region not including the target object 115 in the first frame 110, the image processing apparatus 100 may decrease the exposure of the second frame 121. In response to the brightness of the target object 115 being less than the brightness of the remaining region, not including the target object 115 in the first frame 110, the image processing apparatus 100 may increase the exposure of the second frame 121. In FIG. 1, the exposure of the second frame 121 increases because the brightness of the target object 115 is less than the brightness of the remaining region not including the target object 115.

By adjusting the exposure of the second frame 121, the image processing apparatus 100 may generate a first frame 130 of the synthesized image by synthesizing the first frame 110 and the second frame 123. For example, the image processing apparatus 100 may synthesize the remaining region not including the target object 115 in the first frame 110 and a region 125 corresponding to the target object 115 in the second frame 123. The image processing apparatus 100 may synthesize the remaining region not including the target object 115 in the first frame 110 and a road region of the region 125.

The image processing apparatus 100 may perform above-described operations with respect to a portion of frames to be synthesized among the frames included in the input image. For example, the image processing apparatus 100 continuously monitors presence of the target object in the input image. In response to the target object being recognized from the input image, the image processing apparatus 100 may generate the synthesized image by adjusting the input image as needed. The synthesized image may be used to enable the vehicle to autonomously drive. The surroundings of the vehicle may be more accurately estimated using the synthesized image.

Figure 2:
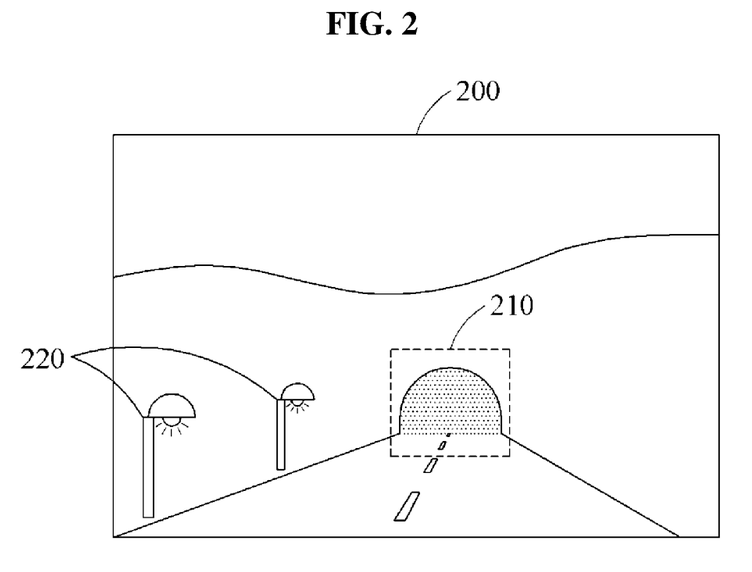
FIG. 2 illustrates an example of a recognition region.

FIG. 2 illustrates an example of a recognition region. An image processing apparatus may scan a predetermined, selectively identified, recognition region instead of scanning an entire region of an input image when a target object is recognized from the input image. A predetermined region on a road may be set as the recognition region. The image processing apparatus may recognize the road in the input image and sets the predetermined region on the road as the recognition region.

FIG. 2 illustrates an input image 200. The image processing apparatus may recognize a road in the input image 200 and sets an identified or predetermined region on the road as a recognition region. In response to the recognition region being set, the image processing apparatus, according to one or more embodiments, selectively pares the region to be scanned and intelligently avoids scanning a portion other than the recognition region in the input image 200. Thus, in an example, the image processing apparatus may effectively and rapidly recognizes a target object 210 in the recognition region.

In response to the recognition region being set, a range or area of a region to be scanned by the image processing apparatus is reduced such that resources used for object recognition are advantageously saved. In addition, in response to the recognition region being set, a possibility that another object is mistaken as a target object may be reduced. For example, objects 220 corresponding to streetlights may typically be mistaken as target objects corresponding to lights of a vehicle. Thus, disadvantageously, in response to the recognition region being not set, or being set inaccurately, an exposure of the input image may, otherwise, be typically adjusted erroneously due to the objects 220. Because the objects 220 are not directly related to driving of the vehicle, computing resources may be wasted in synthesizing the objects 220 of an image.

Rather, in an example, in response to the identified region on the road being set as the recognition region, the objects 220 may not be scanned by the image processing apparatus such that the objects 220 may be not recognized as target objects. The image processing apparatus may prevent the computing resources from being wasted and may enhance an accuracy in object recognition by scanning a target object only in a recognition region.

Figure 3:
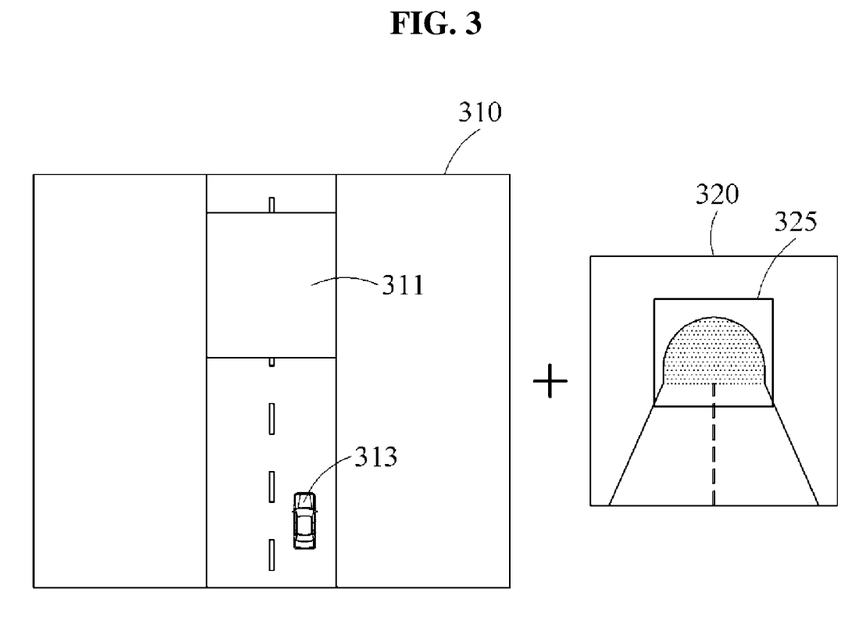
FIG. 3 illustrates an example of a recognition process based on position information.

FIG. 3 illustrates an example of a recognition process based on position information. FIG. 3 illustrates a map 310 and an input image 320.

In an example image processing apparatus advantageously employs position information and image information, e.g. cooperatively, when a target object is recognized. The position information may include a position of a vehicle and a position of an object around the vehicle. The position information may be generated by the image processing apparatus, or generated by a control apparatus of the vehicle to be provided to the image processing apparatus.

The position information may be generated based on various location determination technologies. For example, the position information may be generated based on a global positioning system (GPS) and an inertial measurement unit (IMU), but the position information is not limited thereto. The image processing apparatus may know the position of the vehicle and the position of the object around the vehicle based on the position information, and according to one or more embodiments, employ the position of the vehicle and the position of the object around the vehicle when an object appearing in the input image is recognized.

For example, a target object 311 and a vehicle 313 are represented in the map 310. A target object 325 is included in the input image 320. The image processing apparatus may recognize the target object 325 in the input image 320 based on a point at which the target object 311 is positioned in front of the vehicle 313 on the map 310. In an example, an accuracy in object recognition may be enhanced because the position information and image information are considered together.

A position of a vehicle may be determined, according to embodiments, by different methods depending on situations. For example, the position of the vehicle may be determined based on a GPS because a GPS signal is received from a satellite before the vehicle enters a tunnel. Alternatively, the position of the vehicle may be determined based on an IMU, dead reckoning approach—essentially extrapolating a position based on the previous GPS data and the speed or accelerations of the vehicle, because the GPS signal is not received from the satellite when the vehicle is inside the tunnel.

Figure 4:
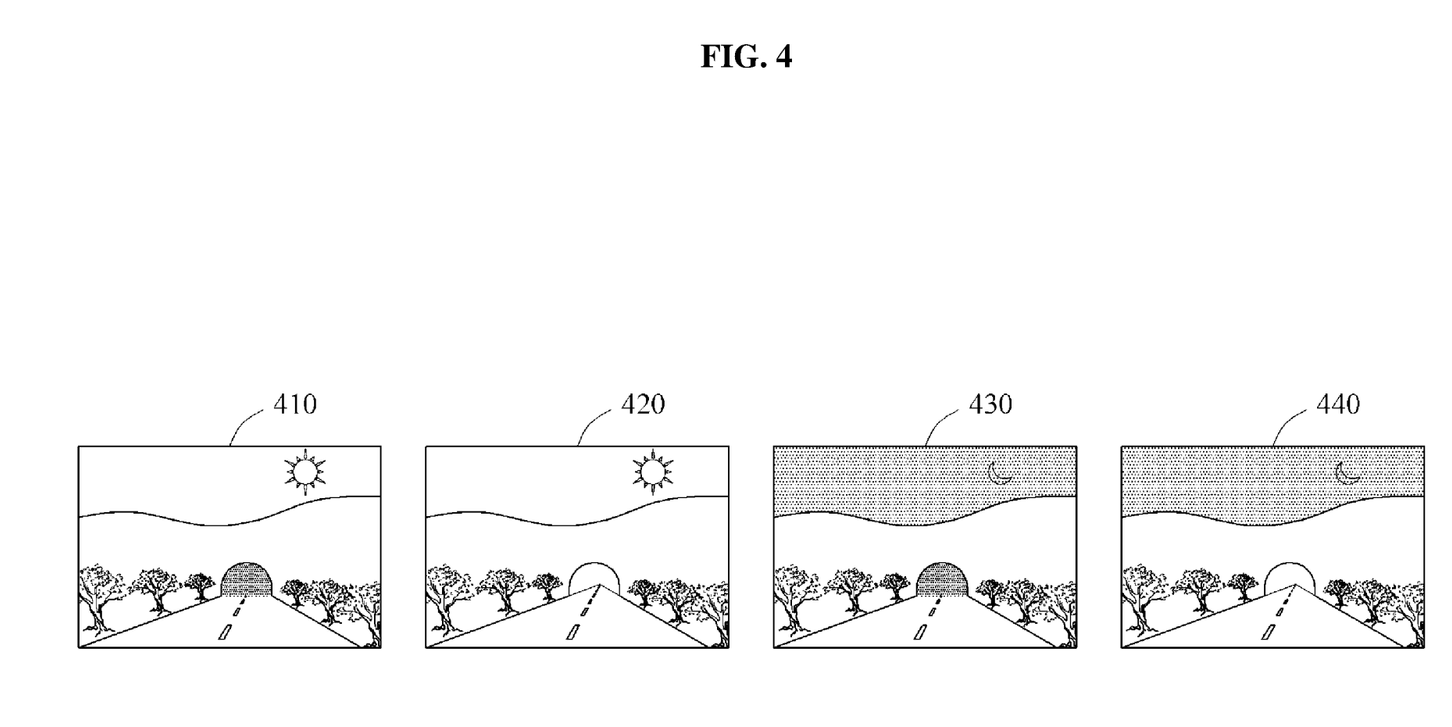
FIG. 4 illustrates examples of a tunnel entrance.

FIG. 4 illustrates examples of a tunnel entrance. FIG. 4 illustrates an input image 410 including a relatively dark tunnel entrance during daytime hours, an input image 420 including a relatively bright tunnel entrance during daytime hours, an input image 430 including a relatively dark tunnel entrance during nighttime hours, and an input image 440 including a relatively bright tunnel entrance during nighttime hours.

An image processing apparatus may recognize a target object in an input image, and adjusts an exposure of the input image based on a difference between a brightness of the target object and a brightness of a remaining region not including the target object. For example, in response to the difference between the brightness of the target object and the brightness of the remaining region (not including the target object) being greater than a predetermined threshold, the exposure of the input image may be adjusted. In FIG. 4, a target object corresponds to a tunnel entrance. An inside of the tunnel may be bright or dark depending on lights in the tunnel, a length of the tunnel, and an amount of light incident to the inside of the tunnel from an outside of the tunnel. Thus, a driving time and amount of lighting (including, for example, ambient light, powered lights of the vehicle or others, stationary tunnel lighting, etc.), during daytime hours or during nighttime hours and a brightness of the inside of the tunnel may be considered when the exposure of the input image is adjusted.

The input image 410 may be captured when a vehicle outside the tunnel enters the relatively dark tunnel during daytime hours. In the input image 410, a tunnel entrance is relatively dark and a remaining portion is relatively bright. Here, a difference between a brightness of the tunnel entrance and a brightness of the remaining portion may be determined to be greater than the predetermined threshold, which, according to embodiment, may be heuristically established. Thus, in response to the input image 410 being received, the image processing apparatus may generate a synthesized image by increasing an exposure of the input image 410.

The input image 420 may be captured, for example, when a vehicle inside the tunnel enters the relatively bright tunnel during daytime hours. In the input image 420, a tunnel entrance and a remaining portion are relatively bright. Here, a difference between a brightness of the tunnel entrance and a brightness of the remaining portion may be less than the predetermined threshold. Thus, in response to the input image 420 being received, the image processing apparatus may selectively avoid generation of a synthesized image.

The input image 430 may be captured when a vehicle outside the tunnel enters the relatively dark tunnel during nighttime hours. In the input image 430, a tunnel entrance and a remaining portion are relatively dark. In this example, a difference between a brightness of the tunnel entrance and a brightness of the remaining portion may be less than the predetermined threshold. Thus, in response to the input image 430 being received, the image processing apparatus may not generate a synthesized image.

The input image 440 may be captured when a vehicle inside the tunnel enters the relatively bright tunnel during nighttime hours. In the input image 440, a tunnel entrance is relatively bright and a remaining portion is relatively dark. In this example, a difference between a brightness of the tunnel entrance and a brightness of the remaining portion may be determined to be greater than the predetermined threshold. Thus, in response to the input image 440 being received, the image processing apparatus may generate a synthesized image by decreasing an exposure of the input image 440.

Figure 5:
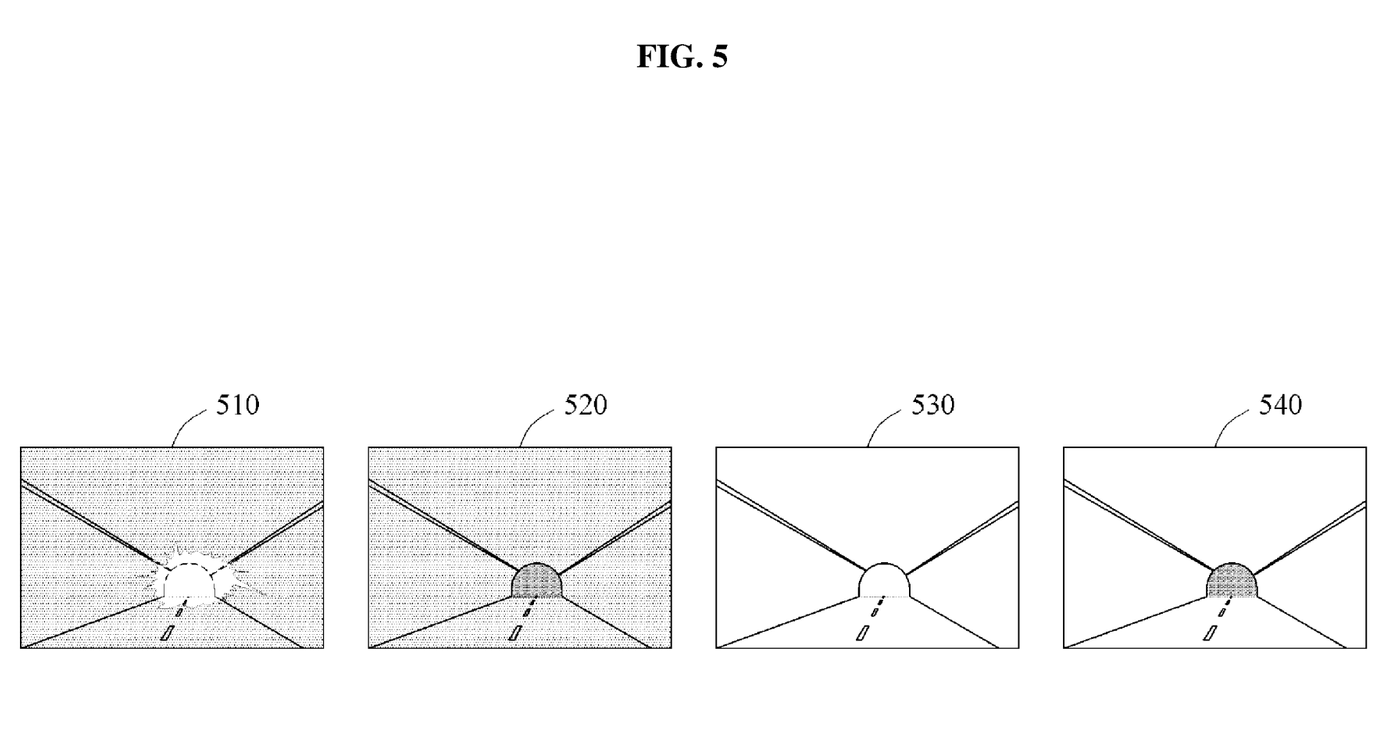
FIG. 5 illustrates examples of a tunnel exit.

FIG. 5 illustrates examples of a tunnel exit. FIG. 5 illustrates an input image 510 including a relatively bright exit of a relatively dark tunnel, an input image 520 including a relatively dark exit of a relatively dark tunnel, an input image 530 including a relatively bright exit of a relatively bright tunnel, and an input image 540 including a relatively dark exit of a relatively bright tunnel. In FIG. 5, a target object corresponds to a tunnel exit. In addition, descriptions provided with reference to FIG. 4 may be also applicable to FIG. 5.

The input image 510 may be captured when a vehicle exits the relatively dark tunnel during daytime hours. In the input image 510, a tunnel exit is relatively bright and a remaining portion is relatively dark. Here, a difference between a brightness of the tunnel exit and a brightness of the remaining portion may be greater than a predetermined threshold. Thus, in response to the input image 510 being received, the image processing apparatus generates a synthesized image by decreasing an exposure of the input image 510.

The input image 520 may be captured when a vehicle exits the relatively dark tunnel during daytime hours. In the input image 520, a tunnel exit and a remaining portion are relatively dark. Here, a difference between a brightness of the tunnel exit and a brightness of the remaining portion may be less than the predetermined threshold. Thus, in response to the input image 520 being received, the image processing apparatus may selectively avoid generating a synthesized image.

The input image 530 may be captured when a vehicle exits the relatively bright tunnel during daytime hours. In the input image 530, a tunnel exit and a remaining portion are relatively bright. Here, a difference between a brightness of the tunnel exit and a brightness of the remaining portion may be less than the predetermined threshold. Thus, in response to the input image 530 being received, the image processing apparatus may not generate a synthesized image.

The input image 540 may be captured when a vehicle exits the relatively bright tunnel during nighttime hours. In the input image 540, a tunnel exit is relatively dark and a remaining portion is relatively bright. Here, a difference between a brightness of the tunnel exit and a brightness of the remaining portion may be greater than the predetermined threshold. Thus, in response to the input image 540 being received, the image processing apparatus may generate a synthesized image by increasing an exposure of the input image 540.

Figure 6:
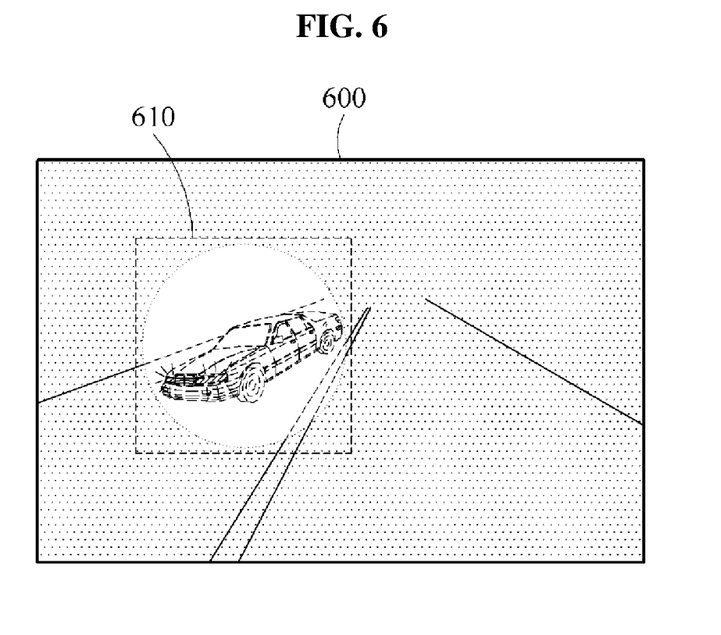
FIG. 6 illustrates an example of a light of a vehicle.

FIG. 6 illustrates an example of a light of a vehicle. In a case in which a relatively bright light is projected to a camera in a relatively dark environment or in a case in which a light being brighter than a neighboring illumination is projected to the camera in a relatively bright environment, it may be difficult to recognize an object in an input image. For example, such cases may include a case in which a light of a vehicle approaching in a direction opposite to a driving vehicle during nighttime hours is projected to a camera, a case in which a backlight is lit between roadside trees during daytime hours, a case in which a light reflected by a neighboring vehicle or a building is projected to the camera during daytime hours, and a case in which a vehicle exits a relatively dark tunnel during daytime hours. In such cases, an image processing apparatus may generate a synthesized image by adjusting an exposure of an input image by considering a relatively bright portion as a target object. Hereinafter, a case in which a light of a vehicle in an opposite direction is projected to a camera during nighttime hours is described as an example, the following descriptions may be similarly applicable to other above-described cases.

An input image 600 is captured during nighttime hours. The input image 600 includes a light 610 of a vehicle driving in an opposite lane in an opposite direction. The image processing apparatus may recognize the light 610 of the vehicle as a target object in the input image 600. Because the light 610 of the vehicle is on a road, the light 610 of the vehicle may be recognized as the target object even when the recognition region is set as a predetermined region on the road.

The image processing apparatus may compare a brightness of the light 610 of the vehicle to a brightness of a remaining region not including the light 610 of the vehicle in the input image 600 after the light 610 of the vehicle is recognized. In response to the brightness of the light 610 of the vehicle being greater than the brightness of the remaining region by a predetermined threshold, the image processing apparatus may generate a synthesized image by adjusting an exposure of the input image 600. Thus, even when the vehicle in the opposite lane in the opposite direction is driving, autonomous driving may, nonetheless, be safely performed using the synthesized image.

Figure 7:
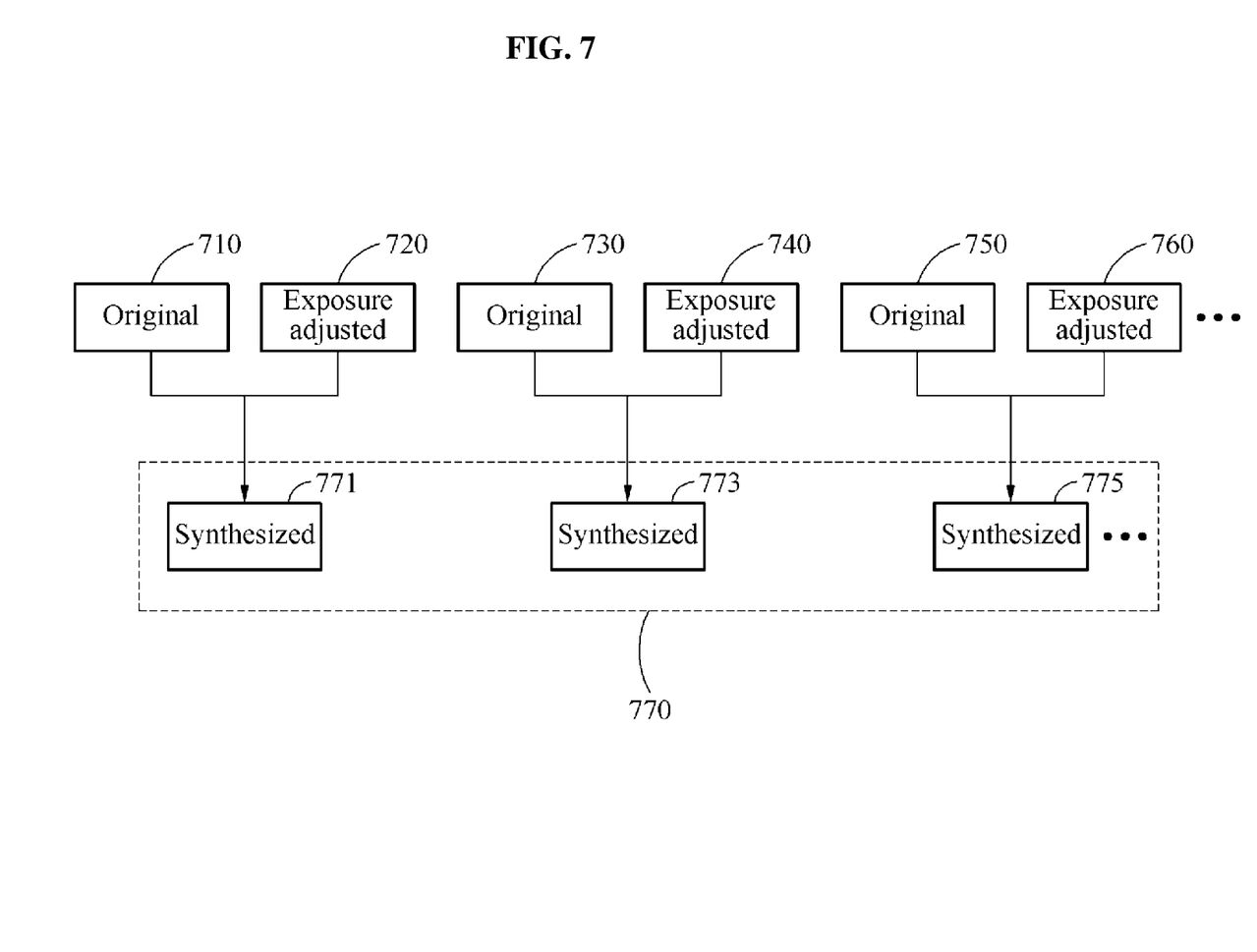
FIG. 7 illustrates an example of a process of generating a consecutive synthesized image based on exposure adjustment.

FIG. 7 illustrates an example of a process of generating a consecutive synthesized image based on exposure adjustment. The process of generating the consecutive synthesized image of FIG. 7 may be applied to an exposure decreasing scenario, for example, a case in which a vehicle enters a relatively bright tunnel during nighttime hours, a case in which the vehicle exits a relatively dark tunnel during daytime hours, and a case in which the vehicle is backlit, and an exposure increasing scenario, for example, a case in which the vehicle enters a relatively dark tunnel during daytime hours and a case in which the vehicle exits a relatively bright tunnel during nighttime hours.

FIG. 7 illustrates a first frame 710 of an input image, a second frame 720 of the input image, a third frame 730 of the input image, a fourth frame 740 of the input image, a fifth frame 750 of the input image, and a sixth frame 760 of the input image. The first frame 710, the third frame 730, and the fifth frame 750 are original images. The second frame 720, the fourth frame 740, and the sixth frame 760 are images of which exposures are adjusted.

An image processing apparatus may recognize a target object in the first frame 710, and adjust the exposure of the second frame 720 based on a brightness of the target object recognized in the first frame 710. For example, the image processing apparatus may adjust the exposure of the second frame 720 in 2 steps. The image processing apparatus may generate a first frame 771 of a synthesized image 770 by synthesizing the first frame 710 and the second frame 720. Similarly, the image processing apparatus may generate a second frame 773 of the synthesized image 770 by synthesizing the third frame 730 and the fourth frame 740, and generate a third frame 775 of the synthesized image 770 by synthesizing the fifth frame 750 and the sixth frame 760.

Figure 8:
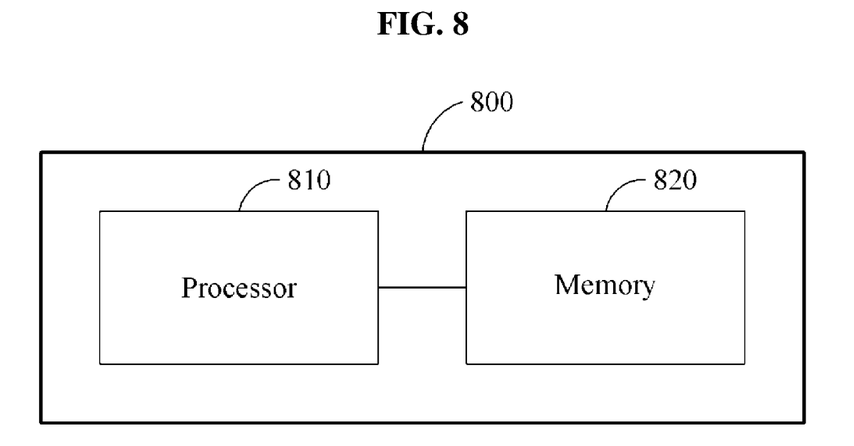
FIG. 8 is a block diagram illustrating an example of an image processing apparatus.

FIG. 8 is a block diagram illustrating an example of an image processing apparatus. Referring to FIG. 8, an image processing apparatus 800 includes a processor 810 and a memory 820.

Figure 9:
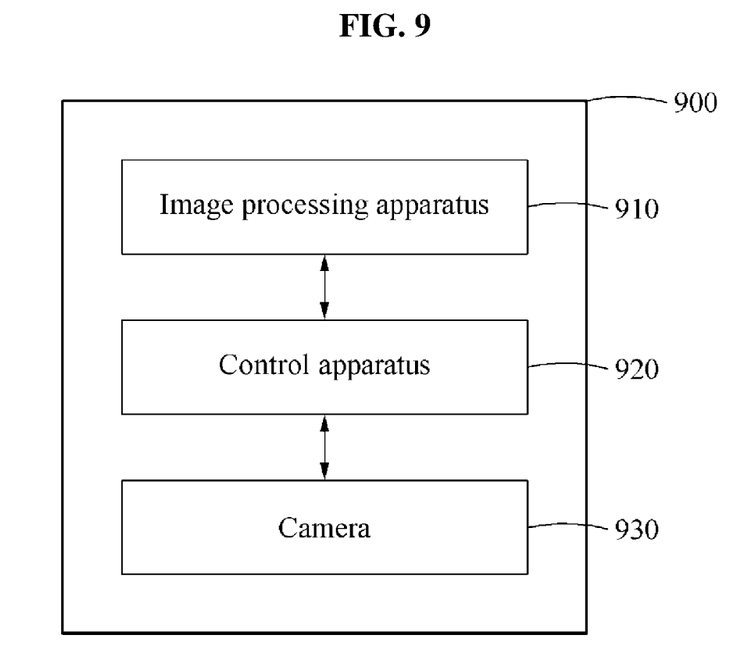
FIG. 9 is a block diagram illustrating an example of an autonomous driving vehicle.

The image processing apparatus 800 may correspond to the image processing apparatus 100 of FIG. 1, the image processing apparatus 910 of FIG. 9, or any other image processing apparatuses described herein. The. processor 810 may perform one or more, or all of the above-described methods or processes described with reference to FIGS. 1 through 7. For example, the processor 810 processes an operation associated with any or any combination of the above-described image processing processes. In an example, the processor 810 recognizes a target object in a first frame of an input image, adjusts an exposure of a second frame of the input image based on a brightness of the target object, and generates a synthesized image by synthesizing the first frame and the second frame.

The memory 820 stores instructions to be readable by a computer. In response to the instructions stored in the memory 820 being executed by the processor 810, the processor 810 may process an operation associated with the above-described neural network. For example, the memory 820 may store trained parameters of the example trained neural network. In addition, the memory 820 stores data associated with the above-described image processing process. For example, the memory 820 stores an input image, a synthesized image, and various thresholds. The memory 820 may be a volatile memory or a non-volatile memory.

The processor 810 executes a program and controls the image processing apparatus 800. The image processing apparatus 800 may be, according to embodiments, connected to an external device, for example, one or more cameras, sensors, or a control apparatus of an autonomous driving vehicle, through an input and output device, thereby performing a data exchange. The image processing apparatus 800 is provided, according to embodiments, as a portion of the autonomous driving vehicles or representative of the vehicle, or an electronic control unit (ECU) of the example vehicle. Repeated descriptions will be omitted for increased clarity and conciseness because the above-described descriptions are also applicable to the image processing apparatus 800.

FIG. 9 is a block diagram illustrating an example of an autonomous driving vehicle. Referring to FIG. 9, an autonomous driving vehicle 900 includes an image processing apparatus 910, a control apparatus 920, and a camera 930. Additionally, any of the presently or previously described image processing apparatus may also be or be representative of such an autonomous driving vehicle. The image processing apparatus 910 recognizes a target object in a first frame of an input image, adjusts an exposure of a second frame of the input image based on a brightness of the target object, and generates a synthesized image by synthesizing the first frame and the second frame. The camera 930 captures an image of surroundings of the autonomous driving vehicle 900, and provides the image of the surroundings of the autonomous driving vehicle 900 to the image processing apparatus 910.

The control apparatus 920 controls a vehicle based on the synthesized image. The control apparatus 920 may be configured to understand or recognize geographic features of the surroundings of the autonomous driving vehicle 900 based on the synthesized image, and control the autonomous driving vehicle 900 such that the autonomous driving vehicle 900 is able to drive itself without a driver performing a steering wheel operation, an acceleration operation, a turn indicator operation, and a deceleration operation (amongst other operations) in an autonomous driving state. For example, the control apparatus 920 may automatically maintain a distance between vehicles, indicate that the autonomous driving vehicle 900 is departing a lane or staying in a lane, and inform the autonomous driving vehicle 900 of an obstacle around the autonomous driving vehicle 900 based on the synthesized image.

Figure 10:
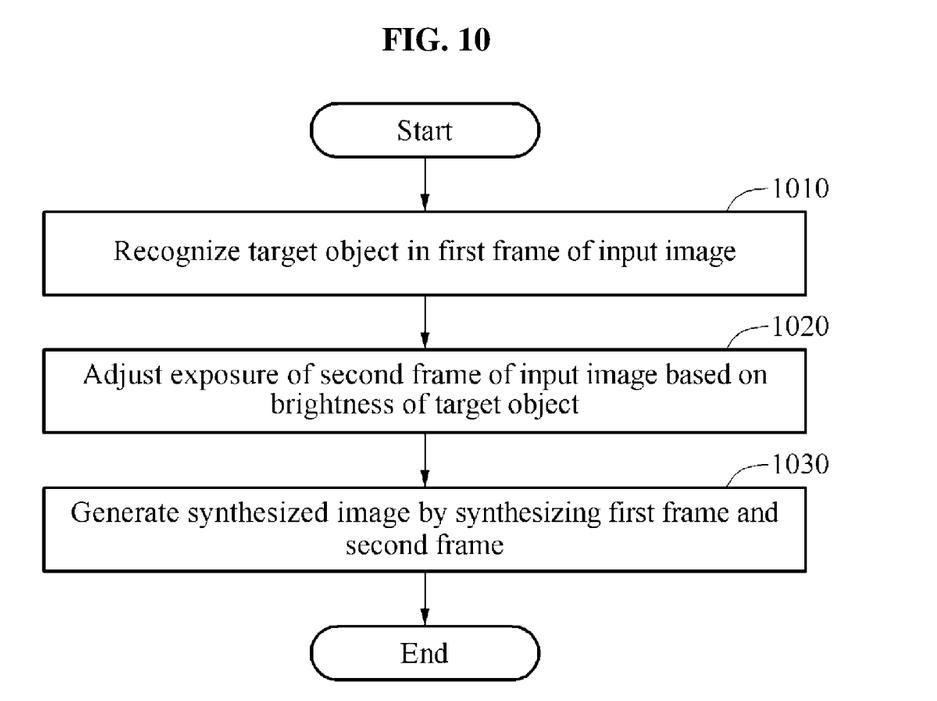
FIG. 10 is a flowchart illustrating an example of an image processing method.

FIG. 10 is a flowchart illustrating an example of an image processing method. Referring to FIG. 10, in operation 1010, an image processing apparatus recognizes a target object in a first frame of an input image. In operation 1020, the image processing apparatus adjusts an exposure of a second frame of the input image based on a brightness of the target object. In operation 1030, the image processing apparatus generates a synthesized image by synthesizing the first frame and the second frame. Repeated descriptions will be omitted for increased clarity and conciseness because the above-described descriptions are also applicable to the image processing method.

The image processing apparatuses, the image processing apparatus 100, 800, 900, 910, control apparatus 920, processor 810, and camera 930 in FIGS. 1-10 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors, neural networks, neuromorphic processors, or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-6 and 10 that perform the operations described in this application are performed by computing hardware, for example, by one or more processors or computers, implemented as described above executing instructions, firmware, or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions, firmware, or software to control computing hardware, for example, one or more processors or computers, and/or a neural network, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions, firmware, or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions, firmware, or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor implemented image processing method, comprising:
   recognizing a target object in a first frame of an input image;
   adjusting an exposure of a second frame of the input image based on a brightness of the target object; and
   generating a synthesized image by synthesizing the first frame and the second frame.

2. The method of claim 1, wherein the recognizing of the target object comprises:
   recognizing a road in the first frame;
   setting a region on the road as a recognition region; and
   recognizing the target object in the recognition region.

3. The method of claim 1, wherein the recognizing of the target object comprises recognizing the target object based on the first frame and a position of a vehicle.

4. The method of claim 1, wherein the target object comprises any one or any combination of two or more of a tunnel entrance, a tunnel exit, and a light of a vehicle.

5. The method of claim 1, wherein the adjusting of the exposure of the second frame and the generating of the synthesized image are performed in response to a difference between the brightness of the target object and a brightness of a remaining region not including the target object in the first frame being greater than a predetermined threshold.

6. The method of claim 1, wherein the adjusting of the exposure of the second frame comprises:
   decreasing the exposure of the second frame in response to the brightness of the target object being greater than a brightness of a remaining region not including the target object in the first frame; and
   increasing the exposure of the second frame in response to the brightness of the target object being less than the brightness of the remaining region not including the target object in the first frame.

7. The method of claim 1, wherein the generating of the synthesized image comprises synthesizing a remaining region not including the target object in the first frame and a region corresponding to the target object in the second frame.

8. The method of claim 1, wherein the generating of the synthesized image comprises synthesizing a remaining region not including the target object in the first frame and a road region of a region corresponding to the target object in the second frame.

9. The method of claim 1, wherein the adjusting of the exposure of the second frame comprises decreasing the exposure of the second frame in response to any one or any combination of two or more of a vehicle entering a bright tunnel during nighttime hours, the vehicle exiting a dark tunnel during daytime hours, and the vehicle being backlit.

10. The method of claim 1, wherein the adjusting of the exposure of the second frame comprises decreasing the exposure of the second frame in response to either one or both of a vehicle entering a dark tunnel during daytime hours and the vehicle exiting a bright tunnel during nighttime hours.

11. A non-transitory computer-readable storage medium storing instructions that, when executed by a processor, cause the processor to perform the method of claim 1.

12. An image processing apparatus, comprising:
   a processor configured to:
   recognize a target object in a first frame of an input image,
   adjust an exposure of a second frame of the input image based on a brightness of the target object, and
   generate a synthesized image by synthesizing the first frame and the second frame.

13. The image processing apparatus of claim 12, wherein the processor is configured to recognize a road in the first frame, set a region on the road as a recognition region, and recognize the target object in the recognition region.

14. The image processing apparatus of claim 12, wherein the processor is configured to recognize the target object based on the first frame and a position of a vehicle.

15. The image processing apparatus of claim 12, wherein the target object includes any one or any combination of two or more of a tunnel entrance, a tunnel exit, and a light of a vehicle.

16. The image processing apparatus of claim 12, wherein the processor is configured to adjust the exposure of the second frame in response to a difference between the brightness of the target object and a brightness of a remaining region not including the target object in the first frame being greater than a predetermined threshold.

17. The image processing apparatus of claim 12, wherein the processor is configured to generate the synthesized image by synthesizing a remaining region not including the target object in the first frame and a region corresponding to the target object in the second frame.

18. The image processing apparatus of claim 12, wherein the processor is configured to generate the synthesized image by synthesizing a remaining region not including the target object in the first frame and a road region of a region corresponding to the target object in the second frame.

19. The image processing apparatus of claim 12, further comprising a memory coupled to the processor, the memory comprising an instruction readable by the processor to control the processor to perform the recognizing of the target object, the adjusting of the exposure, and the generating of the synthesized image.

20. The image processing apparatus of claim 12, wherein the image processing apparatus is an autonomous driving vehicle being controlled based on the synthesized image.

21. The image processing apparatus of claim 19, further comprising an image sensor configured to capture the input image.

22. An autonomous driving vehicle, comprising:
an image processing apparatus configured to
recognize a target object in a first frame of an input image,
adjust an exposure of a second frame of the input image based on a brightness of the target object, and
generate a synthesized image by synthesizing the first frame and the second frame; and
a control apparatus configured to control the autonomous driving vehicle based on the synthesized image.

23. The autonomous driving vehicle of claim 22, wherein the image processing apparatus is configured to recognize a road in the first frame, set a predetermined region on the road as a recognition region, and recognize the target object in the recognition region.

24. An autonomous driving vehicle, comprising:
an image sensor configured to capture an image stream comprising frames;
a processor coupled to the image sensor and configured to
recognize a target object in a first frame of the image stream;
either one or both of
modify an operational parameter of the image sensor based on identified features of the target object in the first frame, and
actuate an auxiliary image sensor;
capture a second frame comprising the target object using either one or both of the modified operational parameter of the image sensor and the auxiliary image sensor; and
control the autonomous driving vehicle based on the second frame.

* * * * *